3,428,129
VERTICAL FRACTURE CONTROL
Evin L. Cook, Dallas, Tex., assignor to Mobil Oil
Corporation, a corporation of New York
Filed Dec. 27, 1966, Ser. No. 604,902
U.S. Cl. 166—292          11 Claims
Int. Cl. E21b 33/13, 43/22, 43/26

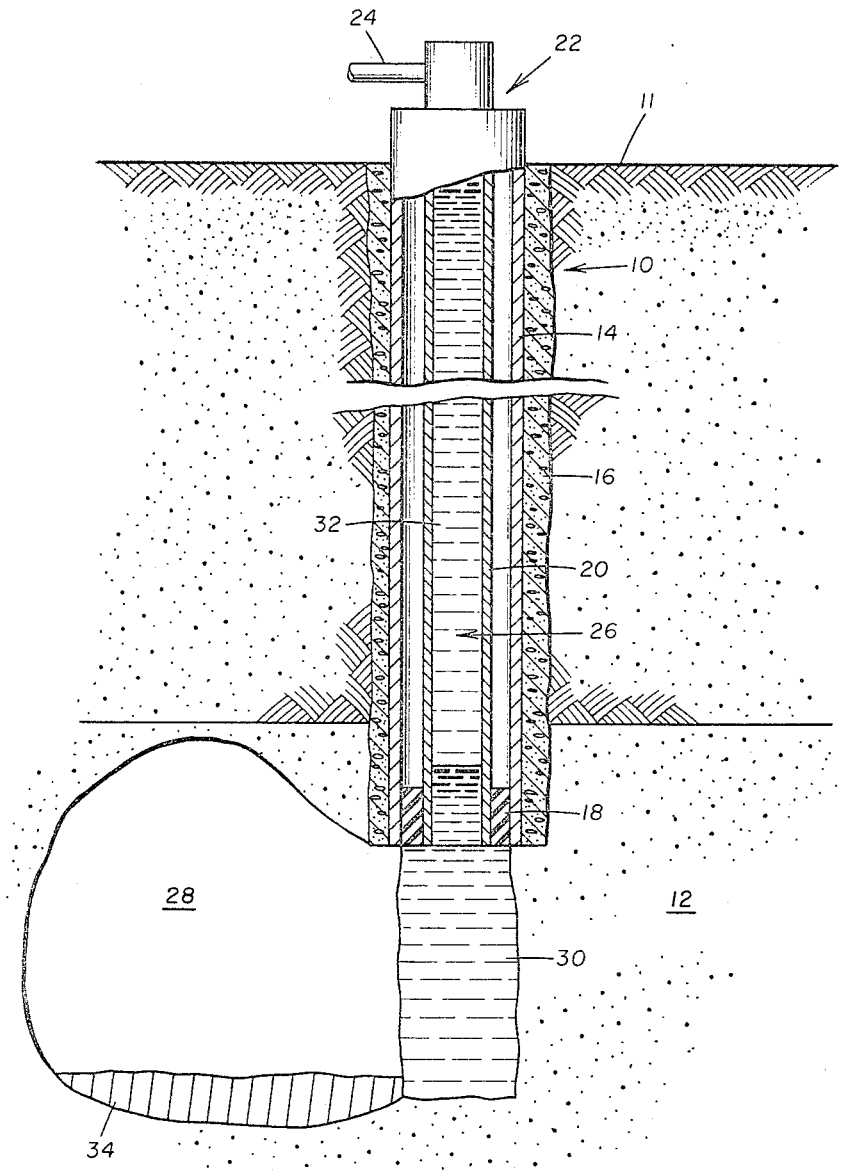

ABSTRACT OF THE DISCLOSURE

The specification discloses a method of fracturing a subterranean formation with a fracturing fluid which includes a material responsive within the formation to form a precipitate of a greater density than the fracturing fluid so that the precipitate tends to settle to the lower part of the fracture; e.g., a fracturing fluid comprising sulfuric acid is injected into a calcareous formation wherein a precipitate of calcium sulfate is formed which in turn settles to the lower part of the fracture.

Background of the invention

This invention relates to the treatment of subterranean formations to increase the permeability thereof and, more particularly, to the control of vertical fractures formed in hydraulic fracturing operations.

It is common practice to produce fractures in subterranean formations in order to increase the permeability thereof. For example, in the oil industry it is conventional to hydraulically fracture a well in order to produce fractures or fissures in the surrounding formation and thus facilitate the flow of oil and/or gas into the well or the injection of fluids from the well into the formation. Such hydraulic fracturing is accomplished by disposing a suitable fracturing fluid within the well opposite the formation to be treated. Thereafter, sufficient pressure is applied to the fracturing fluid to cause the formation to break down with the resulting production of one or more fractures therein. Many times, particularly in relatively deep formations, the fracture or fractures produced are naturally oriented in a predominantly vertical direction.

In many cases it is desirable to avoid forming such fractures within the lower portion of a formation. For example, the formation which is to be fractured may have within the lower portion thereof a water zone. Such a water zone may take the form of a separate stratum which is separated from an overlying oil zone by a relatively narrow shale streak or the water zone and oil zone may be immediately contiguous to one another without such separation. In any case, the extension of a vertical fracture into such a water zone is attended with serious shortcomings. the flow of water into the well from the formation may be greatly enhanced, thus increasing the cost of producing the desired oil from the well. Also, the production of water through the fracture into the well may decrease the capacity of the surrounding formation to produce oil. Even in the absence of a water zone it sometimes is desirable, particularly in injection wells, to fracture only the upper portion of a formation so that the rate of production or injection is increased only within this portion.

For the above and other reasons, it has been proposed to limit the downward propagation of a vertical fracture or to decrease the permeability of such a fracture in the lower portion thereof. For example, it has been proposed to inject, subsequent to the formation of the fracture, a cement into the lower portion thereof which will set under the conditions encountered in the formation and plug the lower portion of the fracture. Also, it has been proposed to utilize during the fracturing operation a propping agent which will tend to settle toward the bottom of the fracture. The propping agent may be comprised of sand which is selected and graded with respect to particle size such that a relatively impermeable mass of sand is deposited in the lower portion of the fracture. As the sand settles to the bottom of the fracture during the fracturing operation the fluid pressure gradient in the downward direction is increased such that further propagation of the fracture tends to proceed in an upward direction.

While the aforementioned techniques of fracture control are sometimes effective they have certain shortcomings. For example, the sand or other propping agent may tend to screen out at the face of the formation thus leading to the deposition of sand within the well and making it difficult to inject the appropriate amount of propping agent into the formation. Further, while the sand may settle to the lower extremities of the fracture it may effectively prop open that portion of the fracture penetrating the water zone and increase the capability of the well to produce the undesired water. Also, in certain hydraulic fracturing operations such as acid fracturing, the inclusion of propping agents within the fracturing fluid may be unnecessary or even undesirable.

Summary of the invention

In accordance with the present invention, there is provided a method of fracturing a subterranean formation penetrated by a well in which the downward fracture propagation is limited. In carrying out the invention there is utilized a fracturing fluid which includes a material responsive within the formation to form a precipitate of a greater density than that of the fracturing fluid. The fracturing fluid is introduced into the well and sufficient pressure is imposed thereon to hydraulically fracture the formation to form at least one vertically oriented fracture within the formation. The fracturing fluid, including the aforementioned material, is disposed within the fracture and a precipitate is formed of a density greater than that of the fracturing fluid. The precipitate thus settles through the fluid to the lower portion of the fracture and effectively increases the fluid pressure gradient in the downward direction within the fracture. Thereafter, the fracture is extended by continuing to force the fracturing fluid into the formation thus enlarging the fracture primarily outwardly and upwardly.

A preferred embodiment of the invention is utilized in the fracturing of a calcareous formation such as a limestone or dolomite. In the treatment of such a calcareous formation in accordance with this embodiment of the invention, the aforementioned material comprises a solution of sulfate ions and the formation is contacted with an acid to produce a solution of calcium ions. The calcium and sulfate ions react within the formation to form a precipitate of calcium sulfate which, being more dense than the fracturing fluid, tends to settle to the bottom of the fracture or fractures formed.

Brief description of the drawing

For a better understanding of the present invention, reference may be had to the following detailed description taken in conjunction with the accompanying drawing which is an illustration, partly in section, of a well showing an environment in which the present invention may be carried out.

Description of the preferred embodiment

With reference to the drawing, there is shown a well 10 which extends from the earth's surface 11 and penetrates a subterranean formation 12 which may be productive of oil and/or gas. The well 10 is provided with a casing 14 which extends into the formation 12 and is cemented within the well as indicated by reference numeral 16. The well also may be provided with a packer 18 which isolates the formation 12 from the upper portion of the well and a tubing string 20 which extends from the wellhead 22 through the packer. A flow line 24 extends from the tubing 20 for the introduction and withdrawal of fluids. It will be understood that the well structure thus far described is exemplary only and that the well may be completed by other suitable techniques. For example, rather than the "open hole" completion shown, the well may be cased and cemented to its total depth and the casing then perforated opposite the formation 12.

In carrying out the invention, a fracturing fluid 26 is introduced into the well and adjacent formation 12 via flow-line 24 and tubing 20. The fracturing fluid includes a material which responds within the formation to form a precipitate of greater density than the fracturing fluid. Thereafter, the formation is hydraulically fractured to form one or more vertically oriented fractures such as the fracture indicated by reference numeral 28.

The procedure by which the vertically oriented fracture or fractures are formed within the formation will be readily apparent to those skilled in the art and, accordingly, will be described only briefly. As the fracturing fluid first reaches the zone of the well adjacent the formation 12, it tends to remain in the well and build up a high pressure on the face of the formation due to the inability of the fracturing fluid to penetrate the formation at the rate at which it is being injected into the well. As pumping of the fracturing fluid into the well continues, the pressure imposed by such fluid on the face of the formation ultimately reaches the so-called "formation breakdown pressure" and one or more fractures such as that indicated by reference numeral 28 are formed.

The fracturing of the formation usually is accompanied by a relatively abrupt and substantial decrease in pressure. Thereafter, the pressure remains relatively constant upon the continued injection of the fracturing fluid into the well, as will be understood by those skilled in the art. The fractures formed may be extended a substantial distance from the well by the continued injection of the fracturing fluid. The formation breakdown pressure in pounds per square inch, i.e., the pressure at which the fractures are initially formed and at which the pressure drop occurs, usually is within the range of about one-half to one times the depth in feet of the formation. This pressure however may vary widely depending upon the depth and nature of the formation and the presence of already existing fractures within the formation.

In many instances the fracture or fractures formed will tend to be naturally oriented in a generally vertical direction. This is particularly true in relatively deep formations in which the so-called "overburden pressure" greatly exceeds the horizontal stresses characteristic of the zone at depth and the strength of the formation. In some cases, it may be desirable to take special steps to promote the formation of vertical fractures. For example, the well 10 may be provided with one or more vertical notches in the wall thereof in order to initially orient the subsequently induced fractures in a vertical plane.

In some cases the vertically oriented fractures will lie generally in a plane common with the axis of the well as shown in the drawing. However, it will be understood that the illustration of fracture 28 is somewhat idealized and that in actual practice the fractures will be of irregular configurations. It also will be recognized that the fracture trend may deviate somewhat from the vertical and that the fractures may lie generally in a plane oblique to the axis of the well. Thus, by the term "vertically oriented fractures" as used herein and in the appended claims is meant fractures which are oriented predominantly in a vertical, rather than a horizontal, direction.

The aforementioned precipitate-forming material may be of any suitable type. Preferably, the material is reactive with a substance within the formation to form the precipitate. Where the formation undergoing treatment is calcareous in nature, the precipitate-forming material preferably comprises a solution of sulfate ions. In this case, the formation may be contacted with an acid in order to dissolve calcareous matter within the formation and produce a solution of calcium ions which react with the sulfate ions to produce a calcium sulfate precipitate.

More particularly, and with further reference to the drawing, the fracturing fluid 26 may include an initial slug of sulfuric acid as indicated by reference numeral 30. The sulfuric acid may be utilized in any suitable amount and concentration. In most cases it will be desirable to utilize an aqueous solution of at least 2% by weight of sulfuric acid in an amount of at least two-thirds gallon per square foot of formation fracture area created by the fracturing fluid which desirably may require plugging. If higher concentrations of acid are used, which will be preferred, correspondingly lower volumes would be needed. As the slug of sulfuric acid enters the formation 12 during the initial stages of the fracturing process, it reacts with the calcareous material within the formation to form a hydrous crystalline precipitate of calcium sulfate. The calcium sulfate precipitate initially formed usually will be gypsum which has a specific gravity of about 2.3 although in some cases the initial product will be anhydrite which has a specific gravity of about 3.0. The initial product also may comprise hydrated sulfates intermediate gypsum and anhydrite. In any case, the calcium sulfate precipitate tends to settle to the bottom of the fracture 28 as indicated by reference numeral 34, thus increasing the fluid pressure gradient within the fracture in the downward direction.

The slug of sulfuric acid is followed by a second portion 32 of the fracturing fluid 26. Portion 32 may be any suitable fluid but it preferably has a density less than the density of the sulfuric acid or other precipitate-forming material. Thus, the precipitating solution will preferentially flow into the lower portion of the fracture 28 with the result that the concurrent precipitate production occurs in this region. This enhances the deposition of the calcium sulfate or other precipitate within the lower portion of the fracture. In the treatment of calcareous formations, the portion 32 preferably will take the form of an aqueous solution of hydrochloric acid.

From the foregoing description, it will be recognized that the precipitation of calcium sulfate will result in fracture propagation proceeding primarily upwardly and outwardly with respect to the well. In addition, the calcium sulfate precipitate will function in many instances to form a highly effective plugging agent or cement within the lower portion of the fracture 28. In this regard, at the temperatures prevailing within the formation the gypsum originally produced may lose some of its water of crystallization to form $CaSO_4 \cdot \frac{1}{2}H_2O$ (plaster of Paris) which upon subsequent contact by water will set up to a gypsum-type cement. Also, the gypsum precipitate may undergo complete dehydration to form anhydrite.

As indicated above, treatment of calcareous formations in accordance with the instant invention may be accomplished with a precipitate-forming material other than sulfuric acid. However, it is preferred to utilize as the precipitate-forming material a solution of sulfate ions and to contact the formation with an acid in order to produce a solution of calcium ions which react with the sulfate ions. Where it is desired to avoid the use of sulfuric acid for reasons of safety or in order to prevent corrosion of downhole well equipment, the precipitate-forming material may take the form of an aqueous solution of an alkali metal sulfate. Preferably, such sulfate is sodium sulfate although other alkali metal sulfates such as potassium sufate or ammonium sulfate may be used.

In carrying out this embodiment of the invention, the alkali metal sulfate solution preferably is injected first into the well as the initial portion of the fracturing fluid. This solution is followed by a suitable acid such as hydrochloric acid. Preferably a relatively small slug of water or other inert liquid is interposed between the sulfate solution and the acid in order to prevent mixing of these materials within the well. This embodiment of the invention is particularly advantageous where it is desired to avoid the formation of the calcium sulfate precipitate immediately adjacent the well. Thus, in carrying out this embodiment of the invention, the sulfate solution forced into the formation during the initial stages of the fracturing process is displaced away from the well bore by the following acid. As the acid dissolves calcareous material within the formation, the calcium ions become available to react with the sulfate at a location within the formation spaced from the well. Thus, there is avoided the possibility of calcium sulfate precipitate being formed at the face of the formation in quantities sufficient to cause plugging of the formation, thus impeding the flow of fracturing fluid thereinto.

In the treatment of essentially noncalcareous formations such as sandstones containing very little or no calcareous matter, the instant invention may be carried out by introducing into the formation a suitable source of calcium ions. Thus, in this aspect of the invention, sulfuric acid and a salt such as calcium chloride may be injected separately into the formation during the initial stages of the fracturing process. Alternatively, a solution of an alkali metal sulfate, preferably sodium sulfate, may be used instead of sulfuric acid. In employing this embodiment care should be exercised in order to avoid premature contact of the two solutions within the well. Thus, it is preferred to inject the sulfuric acid or sulfate solution during the initial stage of the fracturing process and to inject a slug of water or other inert liquid immediately thereafter in order to provide for interface separation between the acid and the subsequently injected calcium salt solution.

Having described specific embodiments of the instant invention, it will be understood that further modifications thereof may be suggested to those skilled in the art, and it is intended to cover all such modifications as fall within the scope of the appended claims.

What is claimed is:
1. In a method of treating a subterranean calcareous formation penetrated by a well, the steps comprising:
   injecting into said well a fracturing fluid including a solution of sulfate ions and an acid, said acid being reactive with said formation to produce a solution of calcium ions which in turn is reactive with said solution of sulfate ions to produce calcium sulfate, said calcium sulfate exhibiting a greater density than said fracturing fluid;
   hydraulically fracturing said formation to form at least one vertically oriented fracture therein and disposing said fluid including said solution of sulfate ions and said acid within said fracture whereby calcium sulfate is formed which in turn settles to the bottom part of said fracture; and
   extending said fracture by further hydraulic fracturing.
2. The method of claim 1 wherein:
   said solution of sulfate ions and said acid both comprise sulfuric acid.
3. The method of claim 1 wherein said step of extending said fracture comprises:
   injecting additional said fracturing fluid into said fracture.
4. The method of claim 1 wherein said step of extending said fracture comprises:
   injecting a second fluid having a density less than said fracturing fluid into said fracture.
5. The method of claim 4 wherein:
   said solution of sulfate ions and said acid both comprise sulfuric acid.
6. The method of claim 5 wherein:
   said second fluid comprises hydrochloric acid.
7. The method of claim 1 wherein said solution of said sulfate ions is introduced prior to said acid and wherein:
   said solution of sulfate ions comprises an alkali metal sulfate solution; and
   said acid comprises hydrochloric acid.
8. The method of claim 7 wherein:
   said solution of sulfate ions comprises sodium sulfate solution.
9. In a method of treating a subterranean formation penetrated by a well, the steps comprising:
   introducing into a well a fracturing fluid comprising a solution of sulfate ions as one portion thereof and a solution of calcium ions as another portion thereof, said portions being introduced separately into said well to avoid premature contact therebetween;
   hydraulically fracturing said formation to form at least one vertically oriented fracture and disposing said portions of said fluid within said fracture whereby calcium sulfate is formed which in turn settles through said fracturing fluid to the lower part of said fracture; and
   extending said fracture by further hydraulic fracturing.
10. The method of claim 9 wherein said step of extending said fracture comprises:
    injecting additional said fracturing fluid into said fracture.
11. The method of claim 9 wherein said step of extending said fracture comprises:
    injecting a second fluid having a density less than said fracturing fluid into said fracture.

References Cited

UNITED STATES PATENTS

| | | | |
|---|---|---|---|
| 556,651 | 3/1896 | Van Dyke | 166—42 |
| 2,272,672 | 2/1942 | Kennedy | 166—29 X |
| 2,896,717 | 7/1959 | Howard | 166—42.1 X |
| 3,042,610 | 7/1962 | Dunlap. | |
| 3,141,501 | 7/1964 | Bernard et al. | 166—42 X |
| 3,155,159 | 11/1964 | McGuire et al. | 166—42.1 X |
| 3,241,613 | 3/1966 | Kern et al | 166—42.1 X |
| 3,243,158 | 5/1966 | Kieschnick et al. | 166—42.1 X |
| 3,335,797 | 8/1967 | Braunlich | 166—42.1 |

OTHER REFERENCES

Why Should I Fracture My Well . . . And How? Oil and Gas Journal Tech-Report, 1957.

CHARLES E. O'CONNELL, *Primary Examiner.*

IAN A. CALVERT, *Assistant Examiner.*

U.S. Cl. X.R.

166—300, 308

UNITED STATES PATENT OFFICE

CERTIFICATE OF CORRECTION

Patent No. 3,428,129                      February 18, 1969

Evin L. Cook

It is certified that error appears in the above identified patent and that said Letters Patent are hereby corrected as shown below:

Column 1, line 54, "the", first occurrence, should read -- The --. Column 2, line 66, "embodiment" should read -- embodiments --. Column 4, line 13, "equeous" should read -- aqueous --. Column 6, line 52, "3,249,158" should read -- 3,243,158 --.

Signed and sealed this 24th day of March 1970.

(SEAL)
Attest:

Edward M. Fletcher, Jr.                      WILLIAM E. SCHUYLER, JR.
Attesting Officer                             Commissioner of Patents